US006502703B2

(12) United States Patent
Scherer et al.

(10) Patent No.: US 6,502,703 B2
(45) Date of Patent: Jan. 7, 2003

(54) METHOD AND APPARATUS FOR STORING AND DISPLAYING ELECTRONIC STORAGE MEDIA

(76) Inventors: Robert Eric Scherer, 525 N. 7th St., Lafayette, IN (US) 47901; Thomas Kevin Scherer, 4807 Pin Oak Park, #4202, Houston, TX (US) 77081

( * ) Notice: Subject to any disclaimer, the term of this patent is extended or adjusted under 35 U.S.C. 154(b) by 0 days.

(21) Appl. No.: 09/839,285

(22) Filed: Apr. 20, 2001

(65) Prior Publication Data

US 2001/0037950 A1 Nov. 8, 2001

Related U.S. Application Data

(60) Provisional application No. 60/202,673, filed on May 8, 2000.

(51) Int. Cl.[7] .................................................. A47F 7/00
(52) U.S. Cl. ........................ 211/40; 211/163; 211/168; 206/308.1; 312/9.46
(58) Field of Search ................................ 211/40, 41.12, 211/163, 168; 312/9.46, 9.45; 206/308.1, 308.2, 308.3

(56) References Cited

U.S. PATENT DOCUMENTS

| | | | | |
|---|---|---|---|---|
| 4,815,483 A | * | 3/1989 | DuGrenier et al. | |
| 4,875,743 A | * | 10/1989 | Gelardi et al. | 211/40 X |
| 5,344,028 A | * | 9/1994 | Angele | 211/40 |
| 5,370,244 A | * | 12/1994 | Peng | 211/40 |
| 5,439,119 A | * | 8/1995 | Chow | 211/40 X |
| 5,584,397 A | * | 12/1996 | Cheng | 211/40 |
| 5,697,684 A | * | 12/1997 | Gyovai | 211/40 X |
| 5,713,463 A | * | 2/1998 | Lakoski et al. | 206/308.1 |
| 5,813,740 A | * | 9/1998 | Chang | 312/9.46 X |
| 5,931,315 A | * | 8/1999 | Lorentz et al. | 211/40 |
| D413,753 S | * | 9/1999 | Allsop | |
| 6,193,061 B1 | * | 2/2001 | Lew et al. | 206/308.1 |
| 6,216,862 B1 | * | 4/2001 | Chang | 206/308.1 |

* cited by examiner

*Primary Examiner*—Robert W. Gibson, Jr.
(74) *Attorney, Agent, or Firm*—Thomas K. Scherer

(57) ABSTRACT

A method and apparatus for storing and displaying electronic storage media includes a longitudinally extending rod and a storage media container adapted to receive the rod. A bore is provided in the storage media container through which the rod engages the storage media container. A hinge provided such that the storage media container can be opened while in engagement with the rod. An end bulb adapted to pass through the bore in the storage media container and be in interference contact with the bore at a point during the passing and a base adapted to removably engage an end of the rod is also included. The longitudinally extending rod is mounted such that the rod is able to engage a plurality of storage media containers concurrently. The storage media container is adapted to hingedly open while in engagement with the longitudinally extending rod.

20 Claims, 9 Drawing Sheets

Top View

Top View

Top View

Side View

Top View

Side View

Top View

Side View

Front View

Side View

Top View

Side View

Top View

Top View

Side View

Front View

METHOD AND APPARATUS FOR STORING AND DISPLAYING ELECTRONIC STORAGE MEDIA

CROSS-REFERENCE TO RELATED APPLICATION

This application claims benefit of provisional application serial No. 60/202,673 filed May 8, 2000.

BACKGROUND OF INVENTION

1. Field of the Invention

The invention is related to a method and apparatus for storing and displaying electronic storage media and, in particular, to a method and apparatus for convenient storage and display of compact discs.

2. Background Art

Generally, electronic data storage discs, commonly referred to as compact discs, or "CDs," are one medium for storing computer programs, computer generated data and audio and visual recordings, for example. As CDs have become more popular, the need for improved packaging and storage devices that provide a secure protective storage device for CDs has likewise increased. Further, it is desirable that such a storage device be inexpensive, lightweight and space conserving.

Conventional CD holders are generally a two part, generally rectangular box and cover combination hinged together to provide storage. Often these "jewel case" type holders also include a separate insert within the holder for actually supporting the disc and prevent unwanted movement of the disc during storage. Developments have been made to these conventional disc containers to ease the opening, closing, and handling of the holder, reduce holder size, and simplify manufacture.

For example, referring to FIG. 1, U.S. Pat. No. 5,713,463 granted to Lakoski et al. discloses a holder (1) that includes two opposed, generally arcuate planar closure members (2a, 2b) which are joined together along a base portion (3) by a living hinge (4). One of the closure members (2a) includes a circular flange defining a bore (5) for receiving a boss (6) projecting centrally from the disc support surface of the other closure member (2b), the boss (6) being an interference fit in the bore (5) for securing the closure members (2a, 2b) together to retain a data disc in the holder (1). The holder may be injection molded of relatively lightweight polypropylene or a similar moldable polymer and may include transverse walls and a double living hinge to provide the jewel box construction and thickness of conventional disk holders.

SUMMARY OF INVENTION

In general, in accordance with one or more embodiments, the present invention is a method for storing and displaying electronic storage media. In general, in one aspect, the present invention is an apparatus for storing and displaying electronic storage media including a longitudinally extending rod and a storage media container adapted to receive the rod.

In accordance with one or more embodiments, the present invention may further include a bore provided in the storage media container through which the rod engages the storage media container, a hinge provided such that the storage media container can be opened while in engagement with the rod, or an end bulb adapted to pass through the bore in the storage media container and be in interference contact with the bore at a point during the passing. The end bulb may be formed in a generally spherical shape or generally conical shape. A base adapted to removably engage an end of the rod may be included. The base may be adapted to maintain the rod in a substantially vertical alignment while engaged. Another base adapted to removably engage an end of the rod may be included and the rod may be maintained in a substantially horizontal alignment when the base removably engages an end of the rod and the another base removably engages another end of the rod. A passage from the bore to the periphery of the storage media container through which the rod can be disengaged from the storage media container may be included.

In general, in one aspect, the present invention is method for storing and displaying electronic storage media including inserting a longitudinally extending rod through a storage media container adapted to receive the rod.

In accordance with one or more embodiments, the method may further include mounting the longitudinally extending rod such that the rod is able to engage a plurality of storage media containers concurrently. The method also may include adapting the storage media container to hingedly open while in engagement with the longitudinally extending rod.

The present invention enhances the ease and convenience of storing and using CDs. Displaying and accessing CDs and CD cases is made more efficient. Other advantages and features will become apparent from the following description, including the figures and the claims.

DETAILED DESCRIPTION

Figure 1A:
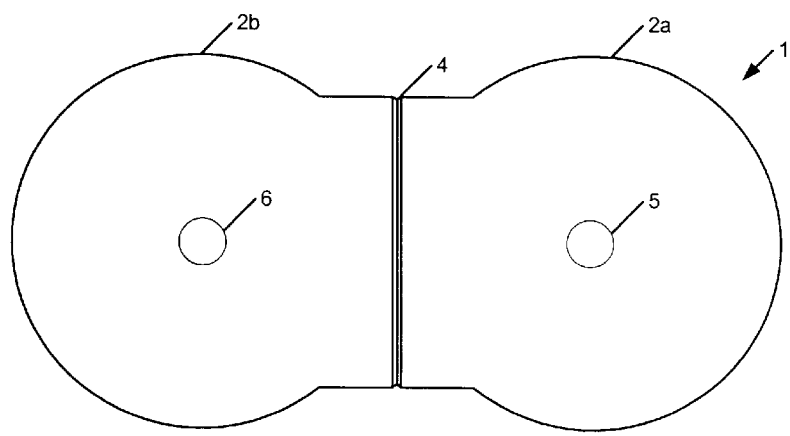
FIG. 1a is a top view of a prior art clamshell-type CD holder.
Figure 1B:
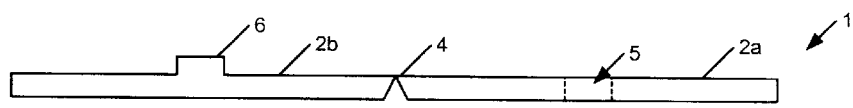
FIG. 1b is a side view of a prior art clamshell-type CD holder.
Figure 2A:
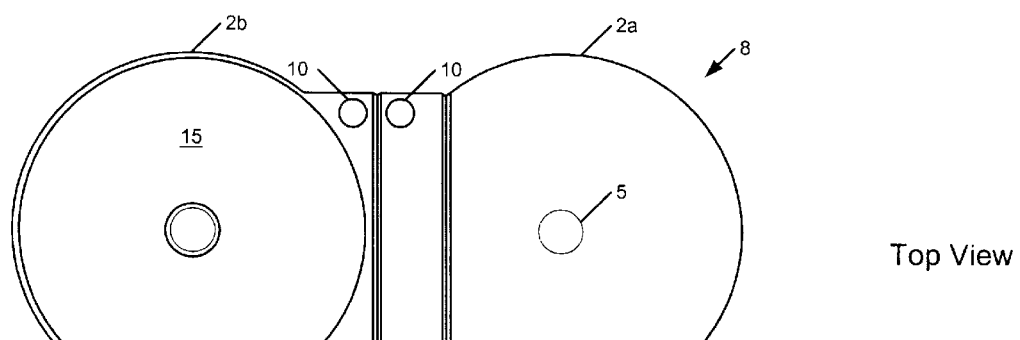
FIG. 2a is a top view of a CD case in accordance with an embodiment of the present invention.
Figure 2B:
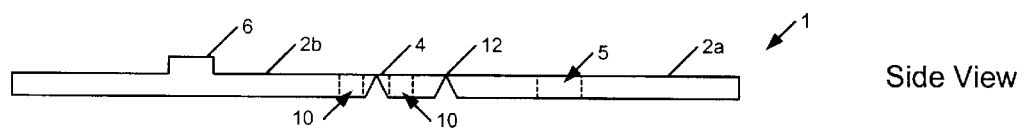
FIG. 2b is a side view of a CD case in accordance with an embodiment of the present invention.

The present invention involves the storage and display of electronic storage media. Generally, in one or more embodiments, the invention can be embodied in an apparatus for storing and displaying CDs on a desktop or other surface. Referring to the drawings wherein like reference characters are used for like parts throughout the several views, FIGS. 2a and 2b show an embodiment of the present invention.

For the purposes of illustration, the CD case 8 is described herein as an improved version of prior art CD case 1. Those skilled in the art will appreciate that the concepts can likewise be applied to other types of media storage devices. The CD case 8 is formed in substantially the same manner as prior art CD case 1 described by Lakoski. Additionally, the CD case 8 is provided with a bore 10 and, optionally, a hinge 12. The bore 10 is located at a position such that, when a CD 15 is stored within the CD case 8, a rod can pass through the bore 10 without touching the stored CD 15.

Figure 3A:
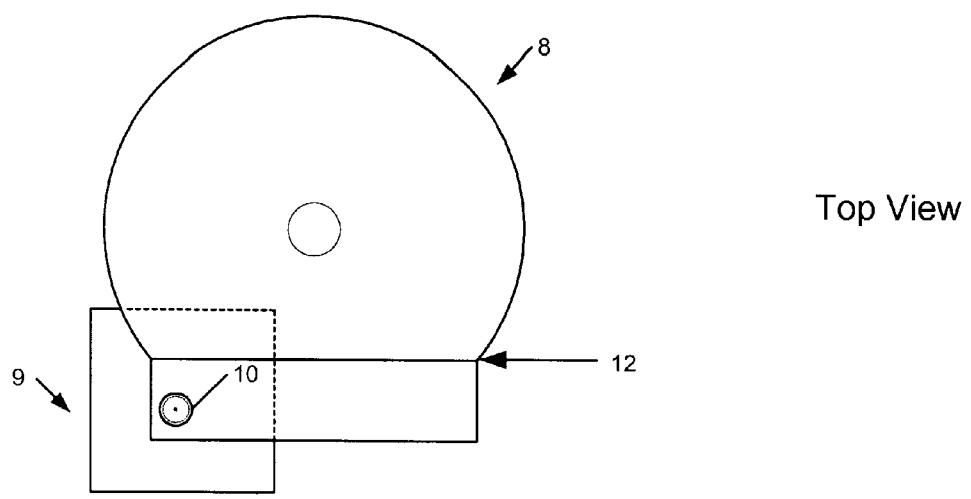
FIG. 3a is a top view of a CD case and case holder in accordance with an embodiment of the present invention.
Figure 3B:
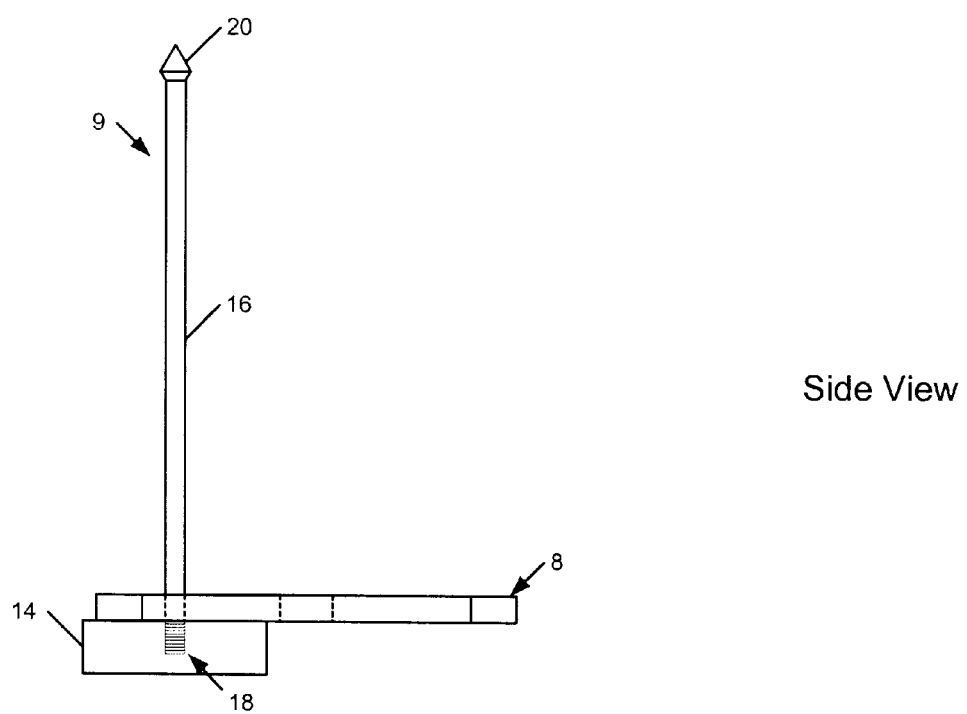
FIG. 3b is a side view of a CD case and case holder in accordance with an embodiment of the present invention.

Referring to FIGS. 3a and 3b, a case holder 9 is provided. In one embodiment, the case holder 9 includes a base 14 and a rod 16. The rod 16 mates with base 14 through a threaded connection 18. The threaded connection 18 may be provided as a helical thread, coaxial with the rod 16, cut into the exterior of the rod 16. A complementary thread is provided in the interior of a bere provided in base 14. The rod 16 is then rotationally engaged with the base 14. At the opposite end, the rod may be provided with an end bulb 20. The CD case 8 slides over end bulb 20 and onto rod 14. When several CD cases are stacked on the case holder 9, the cases can be rotated around rod 14 to view the labels of stored CDs. If additional hinge 12 is included, CDs can be removed from case without removing the CD case from rod 14.

Figure 4A:
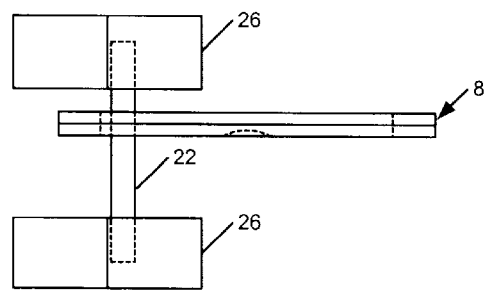
FIG. 4a is a top view of a CD case and case holder in accordance with an embodiment of the present invention.
Figure 4B:
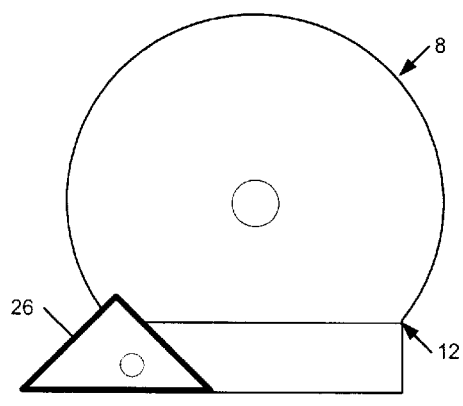
FIG. 4b is a side view of a CD case and case holder in accordance with an embodiment of the present invention.
Figure 4C:
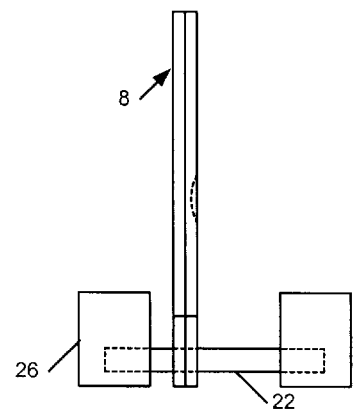
FIG. 4c is a front view of a CD case and case holder in accordance with an embodiment of the present invention.

Referring to FIGS. 4a, 4b, and 4c, in one embodiment, a rod 22 can be inserted through CD case 8 and into end blocks 24, 26. Rod 22 may engage end blocks 24, 26 via a threaded connection, an interference fit, or may simply rest within a bore disposed in end blocks 24, 26. Further, regardless of the connection type, end blocks 24, 26 may have a receptacle for rod 22 on both sides such that two rods can be received by the same end block. In this fashion, the CD display rack becomes modular and can be expanded as necessary. End blocks 24, 26 may be triangular in shape as shown, or may be formed in any other shape, e.g., square, rectangular, octagonal, etc. Also, depending on the length of rod 22, more or less CD cases can be held on one module. The CD cases can then be rotated or slid apart in order to view the labels printed on contained CDs. Additionally, as before, a hinge 12 may be added to allow a CD to be removed from its case without removing the case from rod 22.

Figure 5A:
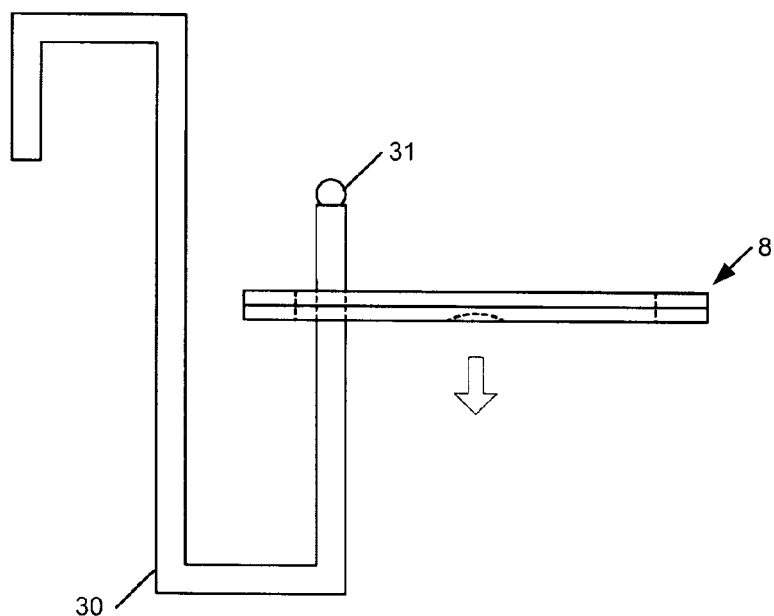
FIG. 5a is a side view of a CD case and case holder in accordance with an embodiment of the present invention.
Figure 5B:
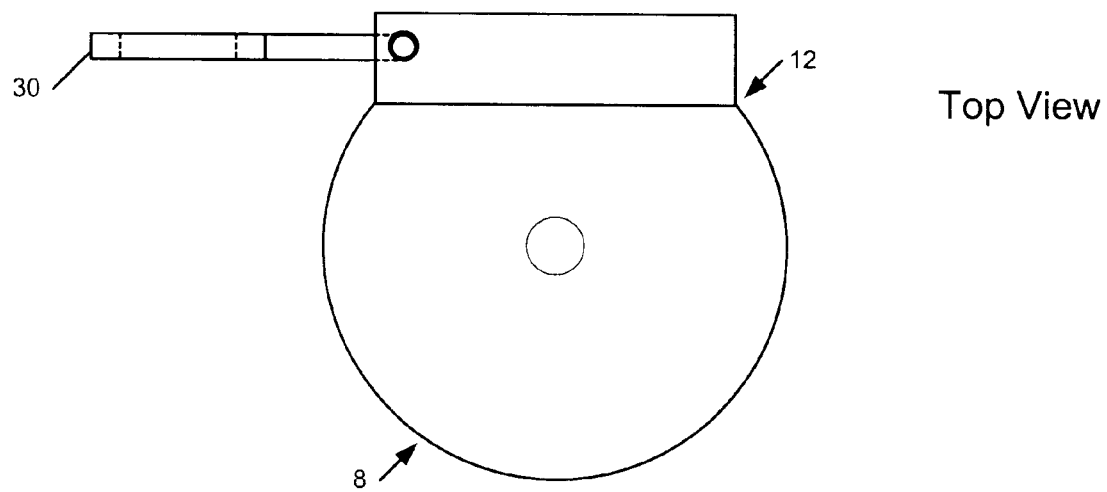
FIG. 5b is a top view of a CD case and case holder in accordance with an embodiment of the present invention.

Generally, in one or more embodiments, the invention can be embodied in an apparatus for storing and displaying CDs from a hanging location. Referring to FIGS. 5a and 5b, this embodiment of the present invention is particularly suitable for use in cubicles. Those skilled in the art will appreciate that many other locations exist where a hanging device for CD cases would be useful. In the embodiment shown, the hanging device 30 is formed such that it can hang over, for example, a wall of a cubicle. The rods that make up the hanging device 30, like the rods making up other embodiments, may be cylindrical, square, triangular, or otherwise shaped in cross-section. Further, the cross-sectional geometry of the bore provided in CD case 8 need not be the same as the cross-sectional geometry of the rods as long as the dimensions allow the rods to pass through the bore.

CD case 8 is inserted onto the hanging device 30 from above and slid down the length of the supporting rod. The length of the supporting rod of hanging device 30 will determine the number of CD cases that can be queued, one on top of another, onto the hanging device 30. Queued CD cases can be rotated to view the CD labels. Once a desired CD is found, the presence of hinge 12 allows the CD to be removed from its case without having to remove a stack of CD cases from the hanging device 30. Further, in this embodiment, an end bulb 31 is disposed on the supporting rod of hanging device 30. This end bulb function similarly to the end bulb described above and would prevent CD cases from sliding off the supporting rod, for instance, when the hanging device 30 was being moved.

Figure 6A:
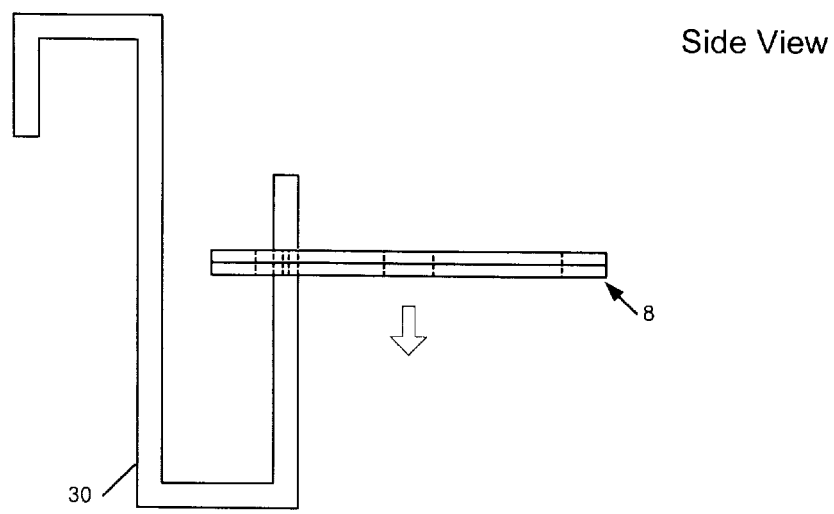
FIG. 6a is a side view of a CD case and case holder in accordance with an embodiment of the present invention.
Figure 6B:
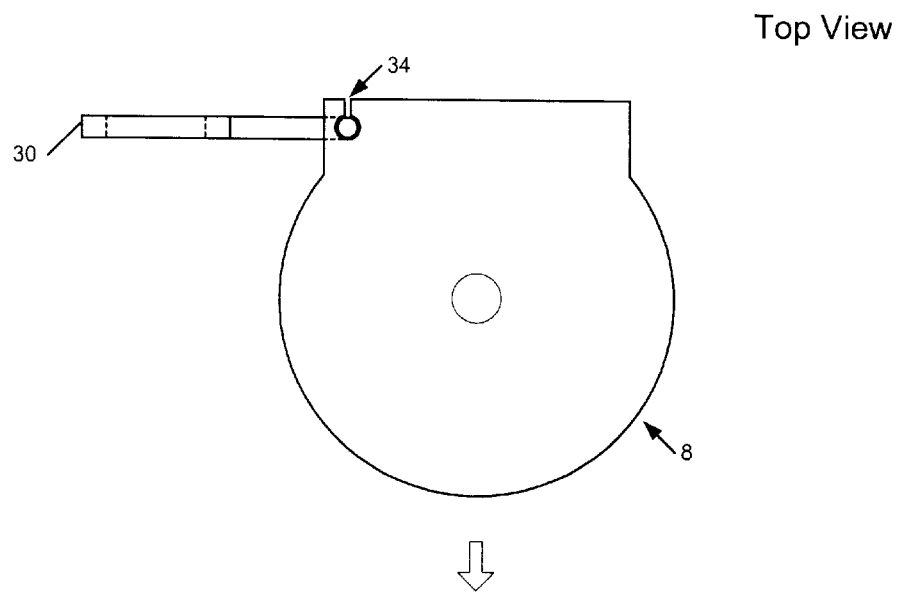
FIG. 6b is a top view of a CD case and case holder in accordance with an embodiment of the present invention.

Alternatively, referring to FIGS. 6a and 6b, in one embodiment, CD case 32 may be formed such that it contains a split bore 34. The provision of a split bore 34 allows direct extraction of a CD case 32 from hanging device 30 in the forward direction (shown by the arrow in FIG. 6b) rather than requiring all CD cases above the desired CD case to be unqueued or requiring that the CD be removed from the case. Those skilled in the will appreciate that a hinge additionally could be provided such that the CD could be removed from the case or the case and CD could be directly removed from the hanging device 30.

Figure 7:
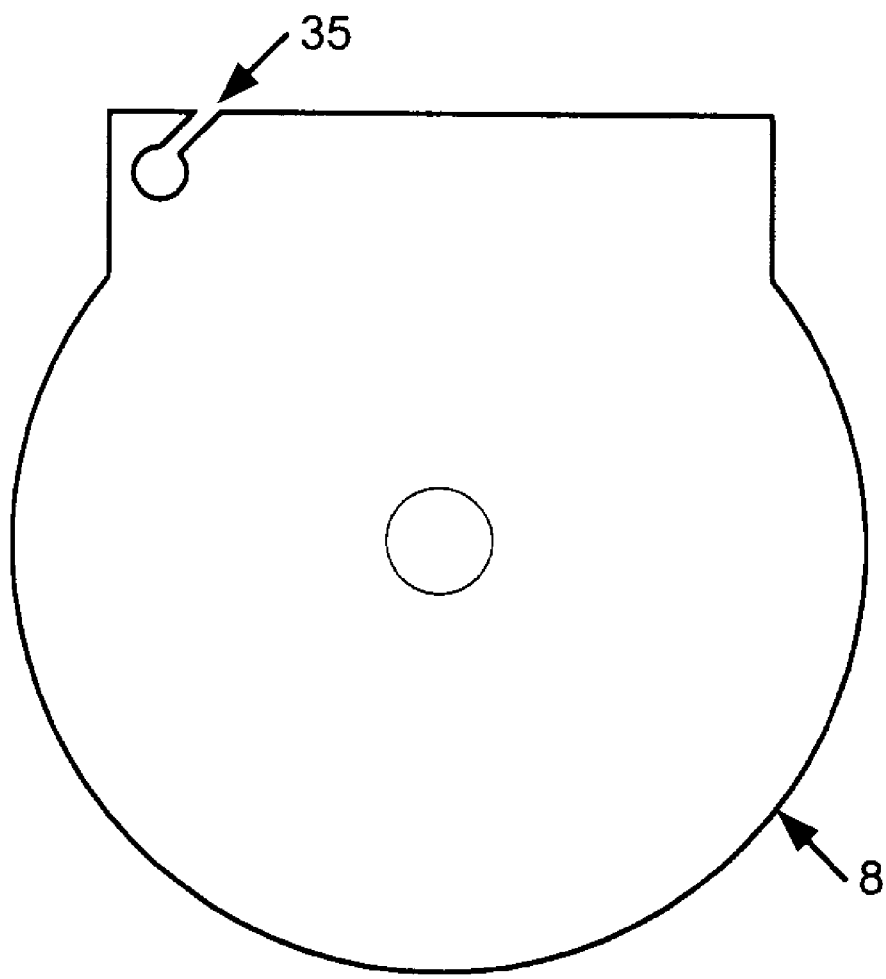
FIG. 7 is a top view of a CD case in accordance with an embodiment of the present invention.

Referring to FIG. 7, a split bore 35 may be disposed in the CD case 8 at an inwardly inclined angle. By angling the split bore toward the interior of the CD case 8, structural integrity can be increased. Those skilled in the art will appreciate that numerous types of passages can be used to perform the function of the split bore. That is, the size of the passage and angle of the passage may be varied without departing from the spirit of the invention.

Figure 8A:
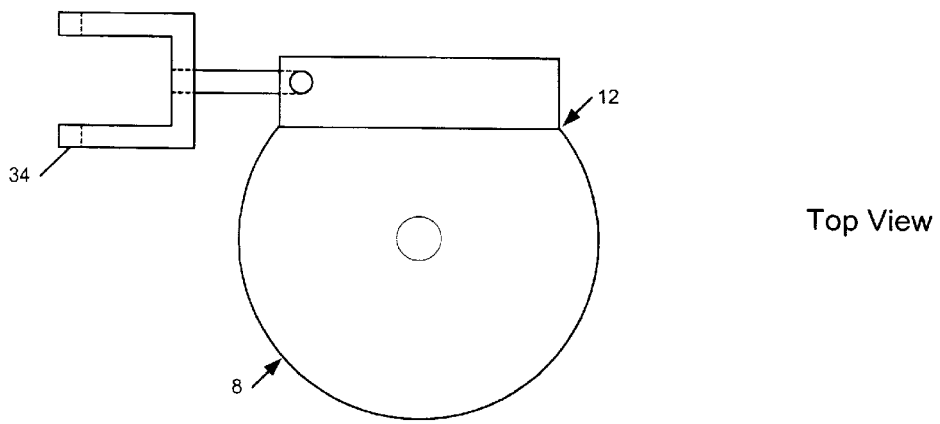
FIG. 8a is a top view of a CD case and case holder in accordance with an embodiment of the present invention.
Figure 8B:
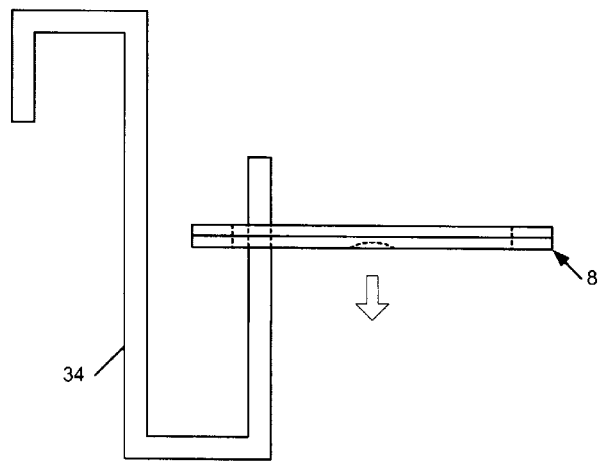
FIG. 8b is a side view of a CD case and case holder in accordance with an embodiment of the present invention.
Figure 8C:
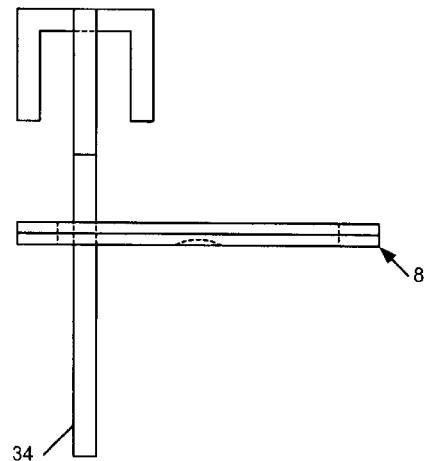
FIG. 8c is a front view of a CD case and case holder in accordance with an embodiment of the present invention.
Figure 9A:
FIG. 9a shows an end portion of a rod in accordance with an embodiment of the present invention.
Figure 9B:
FIG. 9b shows an end portion of a rod in accordance with an embodiment of the present invention.
Figure 9C:
FIG. 9c shows an end portion of a rod in accordance with an embodiment of the present invention.
Figure 9D:
FIG. 9d shows an end portion of a rod in accordance with an embodiment of the present invention.

Referring to FIGS. 8a, 8b, and 8c, in one embodiment, a hanging device 34 is provided with a forked hanging connector. This construction would perform similarly to the above described hanging device. The addition of a forked adds some lateral stability to the hanging device. CD case 8 would engage the hanging device in a manner similar to that described above. Further, CD case 32 may likewise be used with hanging device 34.

Referring to FIGS. 9a, 9b, 9c, and 9d, in one embodiment, the present invention may have various types of bulbs disposed on the end portion of the rod. These end bulbs are exemplary of types that could be disposed at the end of any of the supporting rods such that CD cases would pass across an interference fit. Thereby, the CD cases are prevented from sliding off of supporting rods.

Advantages of the present invention may include one or more of the following. In one or more embodiments, the everyday chaos that is a CD users desktop will become more ordered. Displaying and removing CDs and CD cases is made more efficient. Also, the present invention enhances the ease and convenience of storing and using CDs.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. An apparatus for storing and displaying electronic storage media, the apparatus comprising:
    a longitudinally extending rod;
    storage media container adapted to receive the rod,
    wherein the storage media container comprises two opposed closure members joined together at a base portion by a living hinge;
    wherein the storage media container is adapted to receive the rod within the base portion.

2. The apparatus for storing and displaying electronic storage media of claim 1, further comprising:
    a bore provided in the base portion of the storage media container through which the rod engages the storage media container.

3. The apparatus for storing and displaying electronic storage media of claim 1, further comprising:
    a second hinge provided such that the storage media container can be opened while in engagement with the rod.

4. An apparatus for storing and displaying electronic storage media comprising:
    a longitudinally extending rod;
    a storage media container adapted to receive the rod;
    an end bulb disposed on an end of the longitudinally extending rod adapted to pass through the bore in the storage media container and be in interference contact with the bore at a point during the passing.

5. The apparatus for storing and displaying electronic storage media of claim 4, wherein the end bulb is formed in a generally spherical shape.

6. The apparatus for storing and displaying electronic storage media of claim 4, wherein the end bulb is formed in a generally conical shape.

7. The apparatus for storing and displaying electronic storage media of claim 1, further comprising:
    a base adapted to removably engage an end of the rod.

8. The apparatus for storing and displaying electronic storage media of claim 7, wherein the base is adapted to maintain the rod in a substantially vertical alignment while engaged.

9. The apparatus for storing and displaying electronic storage media of claim 7, further comprising:
    another base adapted to removably engage an end of the rod,
    wherein the rod is maintained in a substantially horizontal alignment when the base removably engages an end of the rod and the another base removably engages another end of the rod.

10. The apparatus for storing and displaying electronic storage media of claim 2 further comprising:
    a passage from the bore to the periphery of the storage media container through which the rod can be disengaged from the storage media container.

11. A method for storing and displaying electronic storage media comprising:
    adapting a storage media container to receive a longitudinally extending rod,
    wherein the storage media container comprises two opposed closure members joined together at a base portion by a living hinge;
    wherein the storage media container is adapted to receive the rod within the base portion.

12. The method of claim 11, further comprising:
    mounting the longitudinally extending rod such that the rod is able to engage a plurality of storage media containers concurrently.

13. The method of claim 11, further comprising:
    providing a second hinge to allow the storage media container to hingedly open while in engagement with the longitudinally extending rod.

14. The apparatus for storing and displaying electronic storage media of claim 1, further comprising:
    a hanging device adapted to support a plurality of storage media containers;
    wherein the hanging device comprises the longitudinally extending rod.

15. The apparatus for storing and displaying electronic storage media of claim 14, wherein the hanging device is adapted to hang over a wall of a cubicle.

16. The apparatus for storing and displaying electronic storage media of claim 14, wherein the hanging device further comprises a forked hanging connector.

17. The apparatus for storing and displaying electronic storage media of claim 1, wherein the longitudinal rod is cylindrical in cross-section.

18. The method of claim 11, further comprising:
    disposing on an end of the longitudinally extending rod an end bulb adapted to pass through a bore in the storage media container through which the rod engages the storage media container and be in interference contact with the bore at a point during the passing.

19. The method of claim 11, further comprising:
    disposing a passage from a bore in the storage media container through which the rod engages the storage media container to the periphery of the storage media container through which the rod can be disengaged from the storage media container.

20. The method of claim 11, further comprising:
    adapting the longitudinally extending rod to hangingly support the storage media container.

* * * * *